United States Patent Office 3,366,626
Patented Jan. 30, 1968

3,366,626
5-NITRO-2'-DEOXYURIDINE
Yelahanka K. S. Murthy and Dieter Kluepfel, Como, Italy, assignors to Lepetit S.p.A., Milan, Italy
No Drawing. Filed May 18, 1965, Ser. No. 456,813
Claims priority, application Great Britain, May 27, 1964, 21,935/64
1 Claim. (Cl. 260—211.5)

This invention is concerned with a new antiviral substance and a process for the preparation thereof.

More particularly, the antiviral substance which forms the subject of this invention is 5-nitro-2'-deoxyuridine of the formula

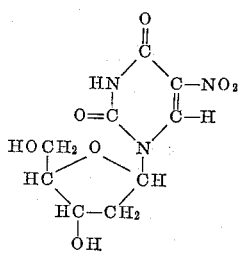

One object of this invention is to provide the new antiviral agent, 5-nitro-2'-deoxyuridine, having a very high degree of activity, in many instances much higher than the activity of well known antiviral agents of similar structure, such as 5-iodo-2'-deoxyuridine.

Another object of this invention is to provide a convenient process for the preparation of 5-nitro-2'-deoxyuridine in commercially useful yields.

The process consists in submitting 5-nitrouracil to the action of an enzyme capable of converting it into the nucleoside 5-nitro-2'-deoxyuridine. To this purpose, the enzyme is first prepared through a microbiological process, by fermenting in a culture medium containing an assimilable carbon source, an assimilable nitrogen source and mineral salts in the amounts which are usual in fermentation procedures, a microorganism which forms said enzyme during fermentation. While it is intended that any such microorganism may be used, provided it gives a reasonable yield of the enzyme, we have found that a particularly suitable organism is *Lactobacillus leichmannii* ATCC 7830. The fermentation may be carried out as usual, for instance by incubating the microorganism at a temperature between 30 and 40° C. for a period variable from 6 to 24 hours. At the end of the fermentation, the cells of the microorganism are isolated, for instance by centrifugation, and subject to disintegration in order to set free the enzyme which is contained in them. An ultrasonic disintegrator may be usefully employed to this purpose, which is caused to act on a buffered suspension of the cells; the enzyme goes into solution and can be stored, after separation of the cellular debris, at low temperatures in frozen condition.

For the enzymatic reaction, 5-nitrouracil is incubated with the enzyme in the presence of thymidine. In the course of this incubation the deoxyribose moiety of thymidine is transferred to 5-nitrouracil, giving 5-nitro-2'-deoxyuridine. Incubation is carried out at temperatures between about 30° and 40° C., and preferably 37° C., for 2–5 hours, on a buffered solution at pH between about 6 and 7, containing thymidine and 5-nitrouracil in variable mutual ratios, which may range between 10:1 and 1:10, and a suitable volume of the crude enzyme preparation obtained as described above. At the end of incubation the product 5-nitro-2'-deoxyuridine can be isolated through several processes, but preferably by chromatography. While reference is made to the examples for a better explanation of the isolation procedures, it may be here occasionally pointed out that water is a good solvent for chromatography in this particular instance. The properties of the obtained product are recorded in Example 1.

EXAMPLE 1

5-nitro-2'-deoxyuridine

Two litres of a medium of the following composition

| | | |
|---|---|---|
| Meat extract | g | 5 |
| Peptone | g | 5 |
| Yeast extract | g | 5 |
| Enzymatically hydrolysed casein | g | 10 |
| Lactose | g | 20 |
| NaCl | g | 1.5 |
| Water | ml | 1000 |
| Final pH | | 7.3 | distributed in 100 ml. portions in 500 ml. Erlenmeyer flasks are inoculated with the culture of *L. Leichmanii* grown in a *microinoculum medium* and incubated on an alternating shaker at 37° C. for 10 hours. The cells harvested by centrifugation are washed with an M/15 phosphate buffer (pH 6.5) and then, after another centrifugation at moderate speed (5,000 g.), resuspended in 20 ml. of said phosphate buffer. This suspension is subjected to an ultrasonic disintegrator and the resulting cellular debris centrifuged at 10,000 g. for 10 minutes. The supernatant represents the crude enzyme preparation and is stored in frozen state at −40° C.

For the enzymatic reaction a solution of thymidine (0.5 g.) to which 0.1 g. of 5-nitrouracil is added, and 50 ml. of the crude enzyme preparation is made up to 500 ml. in M/15 phosphate buffer (pH 6.5). The solution is incubated at 37° C. for 3 hours, heated on a water bath to coagulate proteins and centrifuged. The supernatant is evaporated to dryness in vacuo. The residue extracted with 10×10 ml. of hot ethanol and the combined extracts evaporated to dryness in vacuo. The residue is redissolved in the minimum quantity of water. This solution is chromatographed on a 4×30 cm. column of Dowex-formate which has been equilibrated with 0.1 M ammonium formate adjusted to pH 6.0. The buffer elutes first thymidine closely followed by thymine. The pH is then changed to 3.5. Under these conditions 5-nitro-2'-deoxyuridine is eluted. The solution is evaporated to dryness at 40° C. in vacuo and coevaporated twice with absolute ethanol. The dry residue is then extracted with 5×30 ml. of ethanol, the combined extracts evaporated at 40° C. in vacuo to give a colourless oil that solidifies on standing. This latter, redissolved in 20 ml. of ethanol and evaporated to small volume on standing gives 5-nitro-2'-deoxyuridine.

Ultraviolet spectra

| pH | λ max mµ | ε mol |
|---|---|---|
| 1 | 237 | 8,600 |
| 1 | 305 | 10,600 |
| 7.38 | 323 | 11,450 |

The Rf in ascending thin layer chromatography in ethanol-ammonium acetate 7:3 (pH 7.5) is 0.55. The Rf in descending paper chromatography in $Na_2HPO_4$ solution saturated with isoamyl alcohol is 0.82.

EXAMPLE 2

Two litres of a medium of the following composition

| | |
|---|---|
| Yeast extract _____ g__ | 5 |
| Dextrose _____ g__ | 10 |
| Sodium acetate _____ g__ | 10 |
| Sodium citrate _____ g__ | 10 |
| Enzym. hydrolyzed casein _____ g__ | 5.6 |
| $KH_2PO_4$ _____ g__ | 3 |
| $K_2HPO_4$ _____ g__ | 3 |
| $MgSO_4 \cdot 7H_2O$ _____ g__ | 2.8 |
| $FeSO_4 \cdot 7H_2O$ _____ g__ | 0.17 |
| Tween 80 _____ g__ | 1 |
| Oleic acid _____ g__ | 0.1 |
| Asparagine _____ g__ | 0.1 |
| $MnSO_4 \cdot H_2O$ _____ g__ | 0.16 |
| DL-tryptophan _____ g__ | 0.1 |
| L-cisteine _____ g__ | 0.2 |
| p-Amino-benzoic acid _____ g__ | 0.001 |
| Biotin _____ γ__ | 2 |
| Glutamic acid _____ γ__ | 10 |
| Niacin _____ γ__ | 1000 |
| Calcium pantothenate _____ γ__ | 200 |
| Pyridoxine _____ γ__ | 200 |
| Thiamine _____ γ__ | 200 |
| Riboflavine _____ γ__ | 400 |
| Adenine _____ g__ | 0.01 |
| Guanine _____ g__ | 0.01 |
| Uracil _____ g__ | 0.01 |
| $H_2O$ _____ ml__ | 1000 | distributed in 100 ml. portions in 500 ml. Erlenmeyer flasks are inoculated with a culture of L. leichmannii grown in microinoculum broth (Difco) and incubated at 37° C. for 12 hours. The cells harvested by centrifugation at 5000 g. are washed with M/30 phosphate buffer (pH 6.5) and then, after another centrifugation at the same speed, resuspended in a sufficient quantity of said phosphate buffer to obtain a suspension of a density of 6.5% light transmission (Klett). This suspension is subjected to ultrasonic disintegration and the resulting cellular debris centrifuged at 10,000 g. for 10 minutes. The supernatant represents the crude enzyme preparation and is stored in frozen state at −40° C.

For the enzymatic reaction a solution of 5-nitrouracil (1 g.) to which 0.2 g. of thymidine is added and 80 ml. of the crude enzyme preparation is made up to 160 ml. with 0.25 M acetate buffer pH 5.8. The solution is incubated at 37° C. for 150 minutes. After this incubation the proteins are precipitated by the addition of three volumes of ethanol and centrifuged off at moderate speed. The supernatant is concentrated to 25 ml. in vacuo, filtered and transferred on a 4×30 cm. column of Dowex 1-formate which had been equilibrated with 0.1 M ammonium formate adjusted to pH 6.0. The chromatography yields first thymidine followed by thymine. The pH is then changed to 3.5. Under these conditions the 5-nitro-2′-deoxyuridine is eluted. The fractions are collected and concentrated to ∼50 ml. at 40° C. in vacuo. This solution is extracted 16 times with water saturated n-butanol. The butanol extract is evaporated to dryness in vacuo at 45° C. The residue is dissolved in 25 ml. of absolute ethanol.

This solution is concentrated slowly in vacuo to a small volume. Upon cooling on ice the 5-nitro-2′-deoxyuridine crystallyzes, yielding 110 mg. of pure product.

A comparison was made of the antiviral activity in vitro of 5-nitro-2′-deoxyuridine and other deoxynitrosides. The results are summarized in the following table.

*In vitro activity of 5-nitro-2′-deoxyuridine and other deoxynitrosides*

| Compound | Cytotoxicity (γ/ml.) | Vaccinia (γ/ml.) | H. zoster (γ/ml.) |
|---|---|---|---|
| 5-iodo-2′-deoxyuridine | 250 | 4–2 | 1 |
| 5-bromo-2′-deoxyuridine | 250 | 4–2 | |
| 5-chloro-2′-deoxyuridine | 250 | 4–2 | |
| 5-bromo-2′-deoxycytidine | 125 | 4–2 | |
| 5-nitro-2′-deoxyuridine | 500 | 0.016–0.008 | 0–1 |

5-nitro-2′-deoxyuridine is also active against sheep pox virus at the same concentration as against vaccinia.

The concentrations mentioned above indicate the levels at which a complete inhibition of cytopathic effect of the concerned virus is obtained.

We claim:
1. 5-nitro-2′-deoxyuridine of the formula

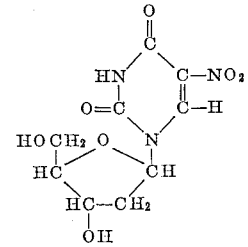

References Cited

UNITED STATES PATENTS 3,235,363   2/1966   Luckenbaugh et al. ___ 260—211
3,282,921   11/1966  Verheyden et al. ____ 260—211

OTHER REFERENCES

Kit et al., Chem. Abst., vol. 60, March 1964, p. 5924 (g).

LEWIS GOTTS, *Primary Examiner.*

E. L. ROBERTS, *Examiner.*

J. R. BROWN, *Assistant Examiner.*